(12) United States Patent
Ullein

(10) Patent No.: US 7,204,773 B2
(45) Date of Patent: Apr. 17, 2007

(54) TENSIONING DEVICE FOR AN INTERNAL COMBUSTION ENGINE

(75) Inventor: Thomas Ullein, Frensdorf (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/125,766

(22) Filed: May 10, 2005

(65) Prior Publication Data
US 2005/0202913 A1 Sep. 15, 2005

Related U.S. Application Data

(63) Continuation of application No. PCT/EP2003/011889, filed on Oct. 25, 2003.

(30) Foreign Application Priority Data

Dec. 7, 2002 (DE) ................. 102 57 234

(51) Int. Cl.
F16H 7/08 (2006.01)
F16H 7/18 (2006.01)

(52) U.S. Cl. .............. 474/111; 474/101; 474/140

(58) Field of Classification Search ............ 474/111, 474/140, 101, 117
See application file for complete search history.

(56) References Cited

U.S. PATENT DOCUMENTS 1,988,421 A * 1/1935 McCann et al. ............ 474/111
3,358,522 A * 12/1967 Poyser et al. .............. 474/111
3,426,606 A * 2/1969 Hopkins .................... 474/111
3,463,605 A * 8/1969 White et al. ................ 423/301
3,950,046 A 4/1976 Lubersmeyer
4,395,250 A * 7/1983 King ......................... 474/111
4,395,251 A * 7/1983 King et al. ................. 474/111
4,505,691 A * 3/1985 Kohler ....................... 474/101
5,730,674 A * 3/1998 Ott ............................ 474/111
5,957,793 A * 9/1999 Schulze ..................... 474/101
6,406,391 B1 6/2002 Ullein
6,572,502 B1 * 6/2003 Young et al. ............... 474/111

FOREIGN PATENT DOCUMENTS

| DE | 23 43 748 | 3/1975 | |
|---|---|---|---|
| DE | 24 10 381 | 9/1975 | |
| DE | 35 06 770 | 8/1986 | |
| DE | 197 17 409 | 10/1998 | |
| DE | 198 55 627 | 6/2000 | |
| EP | 0 945 651 | 2/1997 | |
| GB | 2259964 A * | 3/1993 | ........... 474/111 |

\* cited by examiner

Primary Examiner—Marcus Charles
(74) Attorney, Agent, or Firm—Volpe & Koenig, P.C.

(57) ABSTRACT

A tensioning device for a chain drive of an internal combustion engine, having a support member (1) which is pivotally mounted thereupon and is axially snapped onto and retained on a bearing journal (4) of the support member (1) via a bearing lug (5). The support member (1) is formed as a deep-drawn sheet metal component and is formed in a single piece with the bearing journal (4). The bearing journal (4) is provided with a cup-shaped hollow form. The tensioning rail (2) is axially secured to the support member (1) by a wrap-around (12).

3 Claims, 3 Drawing Sheets

TENSIONING DEVICE FOR AN INTERNAL COMBUSTION ENGINE

CROSS-REFERENCE TO RELATED APPLICATIONS

This application is a continuation of PCT/EP2003/011889, filed Oct. 25, 2003, which is incorporated herein by reference as if fully set forth.

FIELD OF THE INVENTION

The invention relates to a tensioning device for the chain drive of an internal combustion engine, comprising a support member and a tensioning rail, which is pivotally mounted thereupon and is axially snapped onto and retained on a bearing journal of the support member by a bearing lug.

BACKGROUND OF THE INVENTION

A tensioning device of this type has been known from the publication DE 198 55 627 A1. Here, through the use of a securing element the tensioning rail can be mounted to and released from a form element connected to the support member. In order to fix the position of the tensioning rail on the support member, the form element engages a recess in the tensioning rail in a form-fitting manner or contacts a side flank of the tensioning rail.

SUMMARY

The object of the invention is to provide a tensioning device, with the pivotal connection of the support member to the tensioning device having a simple construction, which also permits an easy assembly.

This objective is attained according to the invention such that the support member having the bearing journal is provided in a single piece made from deep-drawn sheet metal, with the bearing journal having a cup-shaped hollow form. In this manner, no additional elements are required, which increases reliability and reduces costs. The production of the support plate occurs without cutting.

The tensioning rail may be impinged in the pivotal direction by a compression spring provided to tension a chain drive, with the spring being supported and held at the support member. Here, the tensioning device may be provided with a protruding snap extending parallel to the central axis of the bearing journal, which in the operational position of the tensioning device is positioned in the area of the stop of the support member. In order to be held axially to the bearing journal, the tensioning rail may be provided with a wrap-around, which extends at one end of the tensioning rail to both sides of the plate-shaped support member.

BRIEF DESCRIPTION OF THE DRAWINGS

An exemplary embodiment of the invention is shown in the drawing and is explained in greater detail in the following. In the drawings.

DETAILED DESCRIPTION OF THE PREFERRED EMBODIMENTS

Figure 1:
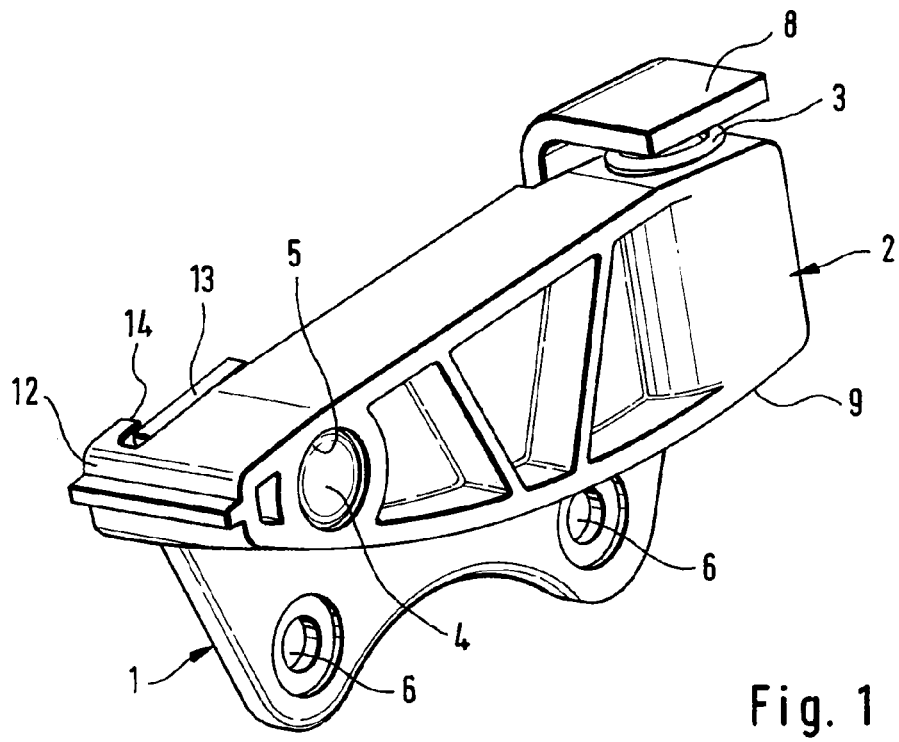
FIG. 1 is a perspective view of the exterior of a tensioning device.

A tensioning device according to the invention comprises only three individual parts, which are a support member 1, a tensioning rail 2, and a compression spring 3. The support member 1 is a deep-drawn sheet metal component and comprises a bearing journal 4 integrally formed in one piece. Onto said bearing journal, a tensioning rail 2 is axially snapped, which may be a plastic component, having a bearing lug 5. The support member 1 is provided with two mounting bores 6, which allow it to be fastened by means of screws to an internal combustion engine.

Figure 3:
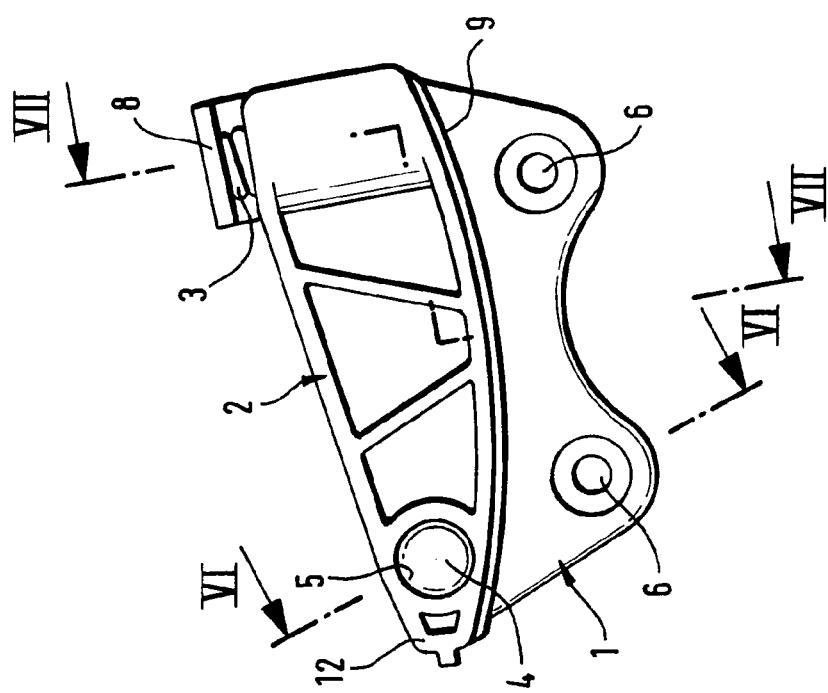
FIG. 3 is a side view of the exterior of the tensioning device.
Figure 6:
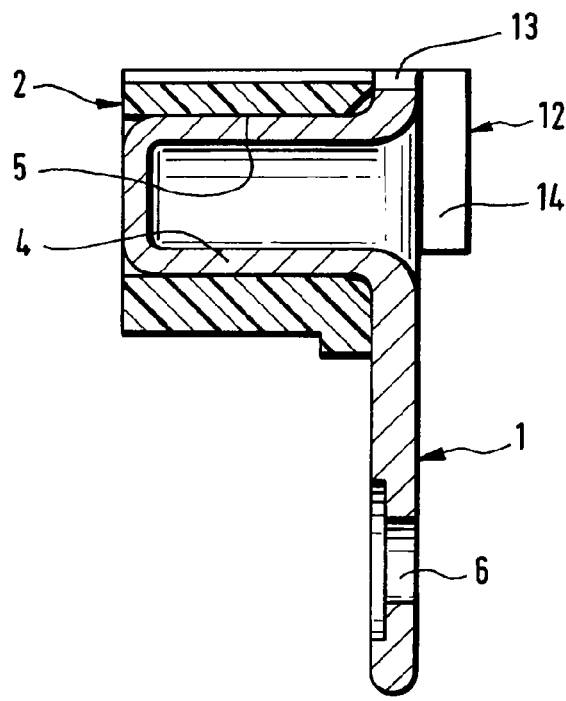
FIG. 6 is a cross-section taken along line VI—VI according to FIG. 3 through the tensioning device.
Figure 7:
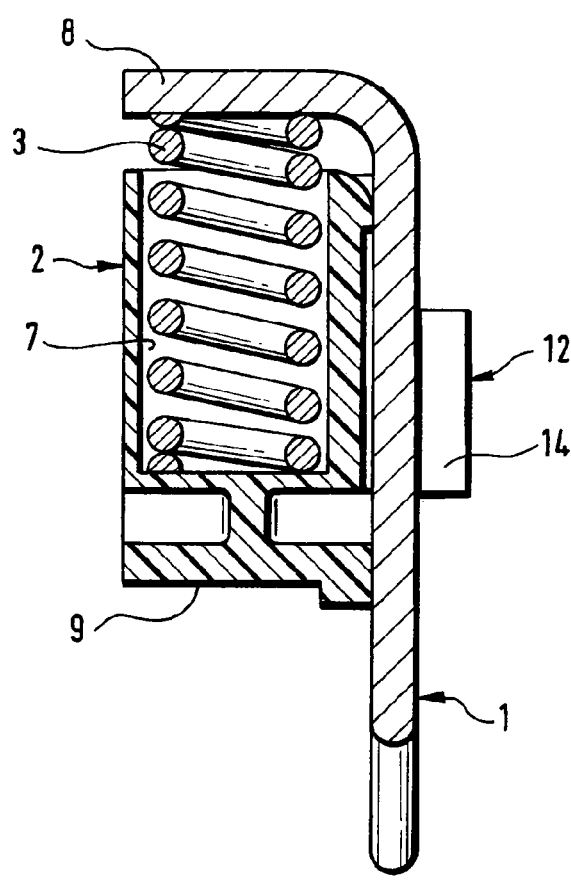
FIG. 7 is a cross-section taken along line VII—VII according to FIG. 3 through the tensioning device.

As discernible from FIG. 3, the tensioning rail 2 is provided as an elongated component having the bearing lug 5 on its left end. At the right end, the compression spring 3, provided as a cylindrical wound compression spring, is inserted into a receiving bore 7 (FIG. 7). With its lower end, the compression spring 3 is supported inside the receiving bore of the tensioning rail 2 and with its upper end, which is outside of the receiving bore 7, it contacts an angled flap 8 of the support member 1. This way, the pre-stressed compression spring 3 causes a pivoting of the bottom side 9 of the tensioning rail 2, provided for the engagement of a chain, around the axis of the bearing journal 4.

The ability to pivot the tensioning rail 2 in reference to the support member 1 is limited by a protruding snap 10, formed as a single piece with the tensioning rail 2 and protruding therefrom parallel to the axis of the bearing lug 5 from the tensioning rail 2 outward. In the proximity of the protruding snap 10, the upper side of the support member 1 forms a stop 11 for the protruding snap 10. Any further rotation of the tensioning rail 2 due to the effect of the compression spring 3 in reference to the support member 1 is no longer possible when the protruding snap 10 contacts the stop 11. The rotation of the tensioning rail 2 in the opposite direction is limited by the compression spring 3 and the flap 8 of the support member 1.

Figure 2:
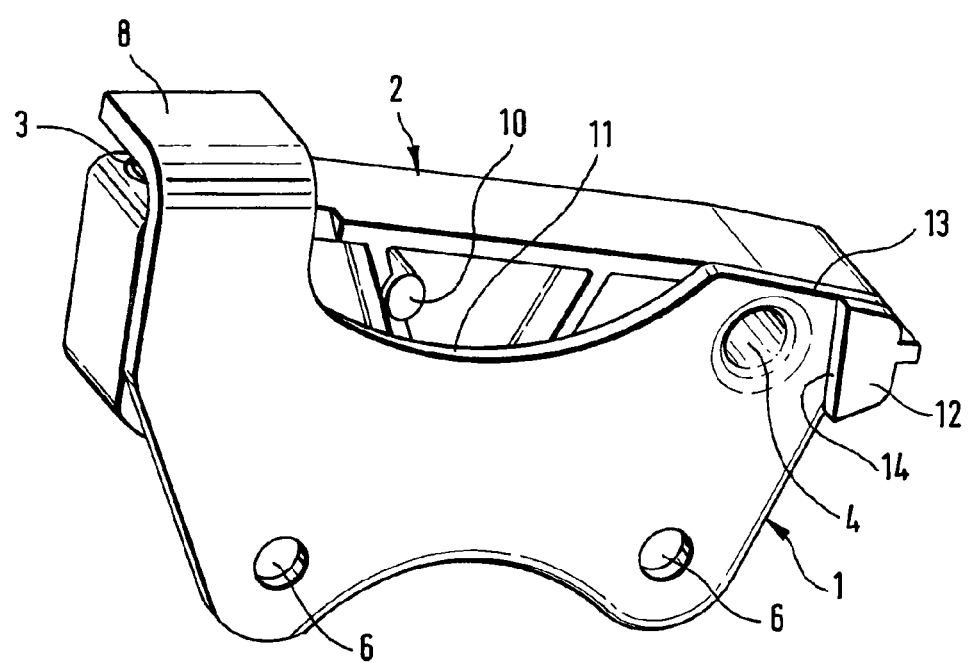
FIG. 2 is a perspective rear view of the tensioning device.
Figure 5:
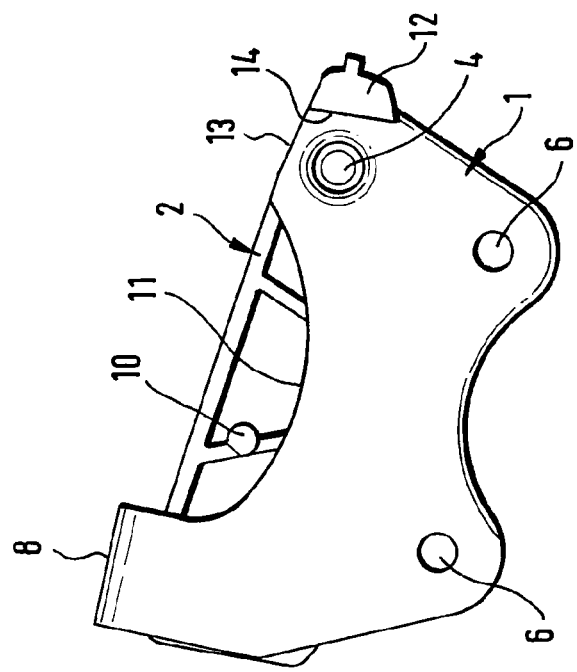
FIG. 5 is a rear view of the tensioning device, by means of which it is mounted flush to an internal combustion engine.
Figure 4:
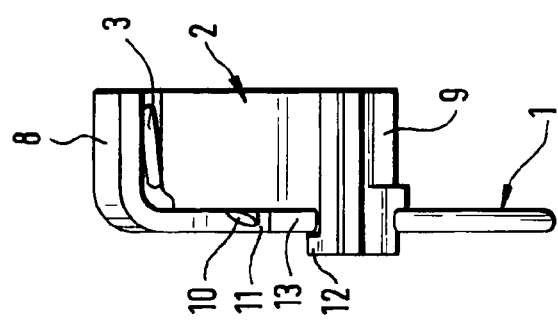
FIG. 4 is a view of the tensioning device rotated 90° in reference to FIG. 3.

The tensioning rail 2 snapped onto the bearing journal 4 is held to the support member 1 in the axial direction of the bearing journal 4 such that it is provided with a wrap-around 12. The wrap-around is formed in one piece with the tensioning rail 2 at the end of the tensioning rail 2, which is located in the area of the bearing lug 5. At this location, the wrap-around 12 encompasses the sheet-metal support member 1 so that a displacement of the tensioning rail 2 in reference to the support member 1 is prevented both in the one axial direction of the bearing journal 4 and the bearing lug 5 and in the other axial direction. In the area of the bearing journal 4, the support member 1 is provided with a flat portion 13. When assembling the tensioning rail 2 to the support member 1, the rail is rotated at the bearing journal 4 from a position shown in FIG. 3 by approximately 90° in the clock-wise direction in reference to the support member 1, so that a flat portion 14 (FIG. 2) at the wrap-around 12 of the tensioning rail 2 can be shifted over the flat portion 13 at the support member 1 in the axial direction of the journal 4. By pivoting the tensioning rail 2 back into the operational position shown in the drawing, the rail returns to its axially secured position at the support member.

Instead of a compression spring 3, a special mechanical or hydraulic tensioning device may also be implemented in the tensioning device. After it has been snapped on, the tensioning rail 2, which is axially snapped onto the deep-drawn bearing journal 4, formed in one piece with the support member 1, is pivoted into its operational position. Here, the wrap-around 12 at the tensioning rail 2 provides for the tensioning rail 2 to be axially secured. Furthermore, the protruding snap 10 locks in the operational position, preventing any rotation of the tensioning rail 2 from the operational position. It is also possible to snap the tensioning rail 2 immediately onto a journal provided on the internal combustion engine.

| Table of Reference Characters | |
|---|---|
| 1 | Support member |
| 2 | Tensioning rail |
| 3 | compression spring |
| 4 | bearing journal |
| 5 | bearing lug |
| 6 | mounting bore |
| 7 | accepting bore |
| 8 | flap |
| 9 | bottom side |
| 10 | protruding snap |
| 11 | stop |
| 12 | wrap-around |
| 13 | flat portion |
| 14 | flat portion |

The invention claimed is:

1. A tensioning device for a chain drive of an internal combustion engine, comprising a support member (1) and a tensioning rail (2), which is pivotally mounted thereupon and is axially snapped onto and retained on a bearing journal (4) of the support member (1) by a bearing lug (5), the support member (1) comprising a one-piece, deep-drawn sheet metal component with a generally flat base portion from which the bearing journal (4) projects in a continuous extension of the sheet metal from the base portion, and the bearing journal (4) has a cup-shaped hollow form, wherein the tensioning rail (2) is provided with a protruding snap (10), which, in an operational position, is located in an area of a stop (11) of the support member (1) and, when in contact with the stop (11), limits pivoting movement of the tensioning rail (2) in relation to the support member (1).

2. A tensioning device according to claim 1, wherein the tensioning rail (2) is impinged upon by a compression spring (3) provided to tension the chain drive in a pivotal direction, the spring being supported and held at the support member (1).

3. Tensioning device according to claim 1, wherein the tensioning rail (2) is provided with a wrap-around (12) for being axially held to the bearing journal (4), the wrap-around extending from one end of the tensioning rail (2) to both sides of the support member (1).

* * * * *